(12) United States Patent
Goldin et al.

(10) Patent No.: US 12,354,341 B2
(45) Date of Patent: Jul. 8, 2025

(54) LOW-POWER CHANGE-BASED NEURAL NETWORK INFERENCE FOR IMAGE PROCESSING

(71) Applicant: SAMSUNG ELECTRONICS CO., LTD., Suwon-si (KR)

(72) Inventors: Ishay Goldin, Tel-Aviv (IL); Yonatan Dinai, Tel-Aviv (IL); Ran Vitek, Tel-Aviv (IL); Michael Dinerstein, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 497 days.

(21) Appl. No.: 17/664,262

(22) Filed: May 20, 2022

(65) Prior Publication Data

US 2023/0377321 A1 Nov. 23, 2023

(51) Int. Cl.
*G06K 9/00* (2022.01)
*G06V 10/42* (2022.01)
(Continued)

(52) U.S. Cl.
CPC ............... *G06V 10/82* (2022.01); *G06V 10/42* (2022.01); *G06V 20/46* (2022.01); *G06V 20/70* (2022.01)

(58) Field of Classification Search
CPC ............... G06N 3/045; G06N 3/08; G06T 2207/20084; G06V 10/82; G06V 10/454; G06V 10/764
See application file for complete search history.

(56) References Cited

U.S. PATENT DOCUMENTS 10,671,288 B2 6/2020 Shao et al.
11,030,518 B2 6/2021 Gebhardt et al.
(Continued)

FOREIGN PATENT DOCUMENTS

EP 3683732 7/2020

OTHER PUBLICATIONS

Teerapittayanon, et al., "BranchyNet: Fast Inference via Early Exiting from Deep Neural Networks" arXiv preprint: arXiv:1709.01686v1 [cs.NE] Sep. 6, 2017, 7 pages.
(Continued)

*Primary Examiner* — Gregory A Morse
*Assistant Examiner* — Owais Iqbal Memon
(74) *Attorney, Agent, or Firm* — MORGAN, LEWIS & BOCKIUS LLP

(57) ABSTRACT

One or more aspects of the present disclosure enable high accuracy computer vision and image processing techniques with decreased system resource requirements (e.g., with decreased computational load, shallower neural network designs, etc.). As described in more detail herein, one or more aspects of the described techniques may leverage key layers (e.g., certain key layers of a neural network) and compressed tensor comparisons to efficiently exploit temporal redundancy in videos and other slow changing signals (e.g., to efficiently reduce neural network inference computational burden, with only minor increase in data transfer power consumption). For example, key layers of a neural network may be identified, and temporal/spatial redundancy across frames may be efficiently leveraged such that only a computation region in a subsequent frame n+1 is re-computed in layers between identified key layers, while remaining feature-map calculations may be disabled in the layers between the identified key layers.

17 Claims, 8 Drawing Sheets

(51) Int. Cl.
*G06V 10/82* (2022.01)
*G06V 20/40* (2022.01)
*G06V 20/70* (2022.01)

(56) References Cited

U.S. PATENT DOCUMENTS

| | | | |
|---|---|---|---|
| 11,074,474 B2 | 7/2021 | Park | |
| 11,164,004 B2 | 11/2021 | Shi et al. | |
| 2020/0143226 A1 | 5/2020 | Georgiadis | |
| 2021/0266565 A1 | 8/2021 | Zhou et al. | |
| 2022/0156943 A1* | 5/2022 | Zhang | G06N 3/044 |
| 2022/0159278 A1* | 5/2022 | Habibian | H04N 19/197 |
| 2022/0385907 A1* | 12/2022 | Zhang | H04N 19/103 |
| 2023/0076266 A1* | 3/2023 | Ying | G06N 3/08 |

OTHER PUBLICATIONS

Pan, et al. "VA-RED2: Video Adaptive Redundancy Reduction", arXiv preprint: arXiv:2102.07887v2 [cs.CV] Oct. 5, 2021, 19 pages.

De Alwis, et al., "Temp Diff: Temporal Difference-Based Feature Map-Level Sparsity Induction in CNNs with <4% Memory Overhead", 2021 IEEE 3rd International Conference on Artificial Intelligence Circuits and Systems, 4 pages.

Jain, et al., "Efficient Inference on Video, In Real-Time and At Scale", Electrical Engineering and Computer Sciences, University of California at Berkley, Technical Report No. UCB/EECS-2020-35 (May 1, 2020), 79 pages.

Cavigelli, et al., CBinfer: Exploiting Frame-to-Frame Locality for Faster Convolutional Network Inference on Video Streams, arXiv preprint: arXiv:1808.05488v2 [cs.CV] Mar. 4, 2019 (16 pages).

Pan, et al., "Recurrent Residual Module for Fast Inference in Videos", Computer Vision and Pattern Recognition, Feb. 27, 2018, pp. 1536-1545.

Figurnov, et al., "Spatially Adaptive Computation Time for Residual Networks", Computer Vision and Pattern Recognition, Jul. 2, 2017 (v2), pp. 1039-1048.

Meng, et al., "Adafuse: Adaptive Temporal Fusion Network for Efficient Action Recognition", arXiv preprint: arXiv:2102.05775v1 [cs.CV] Feb. 10, 2021, 15 pages.

* cited by examiner

LOW-POWER CHANGE-BASED NEURAL NETWORK INFERENCE FOR IMAGE PROCESSING

BACKGROUND

The following relates generally to image processing, and more specifically to low-power change-based neural network inference for computer vision and image processing tasks.

The use of image capture devices, which may include still image cameras, moving image cameras or other electronic devices that include cameras or image sensors, has rapidly increased in recent years along with advancements in camera technology. For example, mobile communication terminals, such as cell phones, smartphones, portable computers, tablet computers, and other similar electronic devices may commonly include digital cameras. Further, higher quality and less expensive cameras are available to consumers and camera users due to such advancements in camera technology.

With advancements in digital camera technology, existing analog camera functions have been digitized, and the scope of digital camera technology has been expanded to a variety of new fields. Digital cameras may use image sensors (e.g., to capture images) and image signal processors (e.g., to process the captured images). Digital signal processors may perform tasks on image frame output features, such as image segmentation tasks, image sharpening tasks, noise reduction tasks, color control tasks, etc. For instance, object detection generally refers to image processing tasks (e.g., or video processing tasks) for detecting one or more objects in digital image frame data. As pixel quantities of image sensors increase, image processing speed and object detection accuracy become more important.

Recently, computer vision and image processing tasks may leverage neural networks for improving performance of such tasks. However, some applications (e.g., real-time video neural network applications) may demand significant compute resources (e.g., that may be lacking on certain devices, such as mobile devices). Additionally, conventional neural network implementations for computer vision and image processing tasks may generally be expensive in terms of cost and power.

Accordingly, due to practical electronic device resource constraints (e.g., device memory constraints, device computation constraints, power consumption constraints, etc.), there is a need in the art for techniques that efficiently leverage neural networks for such tasks.

SUMMARY

A method, apparatus, non-transitory computer readable medium, and system for low-power change-based neural network inference for computer vision and image processing tasks are described. One or more aspects of the method, apparatus, non-transitory computer readable medium, and system include receiving a video comprising a plurality of video frames; computing a first projection matrix by performing a first convolution operation on first input features of a first frame from the plurality of video frames at a first layer of neural network; compressing the first projection matrix to obtain a first compressed projection matrix; computing a second projection matrix by performing the first convolution operation on second input features of a second frame of the plurality of video frames at the first layer; compressing the second projection matrix to obtain a second compressed projection matrix; comparing the first compressed projection matrix to the second compressed projection matrix to obtain a projection mask; computing a third projection matrix by performing a second convolution operation on a first portion of third input features of the second frame at a second layer of the neural network based on the projection mask; and generating label data for the video based on the third projection matrix.

A method, apparatus, non-transitory computer readable medium, and system for low-power change-based neural network inference for computer vision and image processing tasks are described. One or more aspects of the method, apparatus, non-transitory computer readable medium, and system include receiving a video comprising a plurality of video frames; computing a first projection matrix by performing a first convolution operation on first input features of a first frame from the plurality of video frames at a first layer of neural network; computing a second projection matrix by performing the first convolution operation on second input features of a second frame of the plurality of video frames at the first layer; comparing the first projection matrix to the second projection matrix to obtain a projection mask; computing a third projection matrix by performing a second convolution operation on a first portion of third input features of the second frame at a second layer of the neural network based on the projection mask; determining that a third layer of the neural network is a key layer; using output features of the third layer from the first frame as input for a fourth layer of the neural network based on the determination; and generating label data for the video based on the third projection matrix.

An apparatus, system, and method for low-power change-based neural network inference for computer vision and image processing tasks are described. One or more aspects of the apparatus, system, and method include a first layer configured to compute a first projection matrix by performing a first convolution operation on first input features of a first frame from a plurality of video frames, and to compute a second projection matrix by performing the first convolution operation on second input features of a second frame of the plurality of video frames at the first layer; a mask component configured to generate a projection mask by comparing the first projection matrix to the second projection matrix; and a second layer configured to compute a third projection matrix by performing a second convolution operation on a first portion of third input features of the second frame at based on the projection mask.

DETAILED DESCRIPTION

Figure 1:
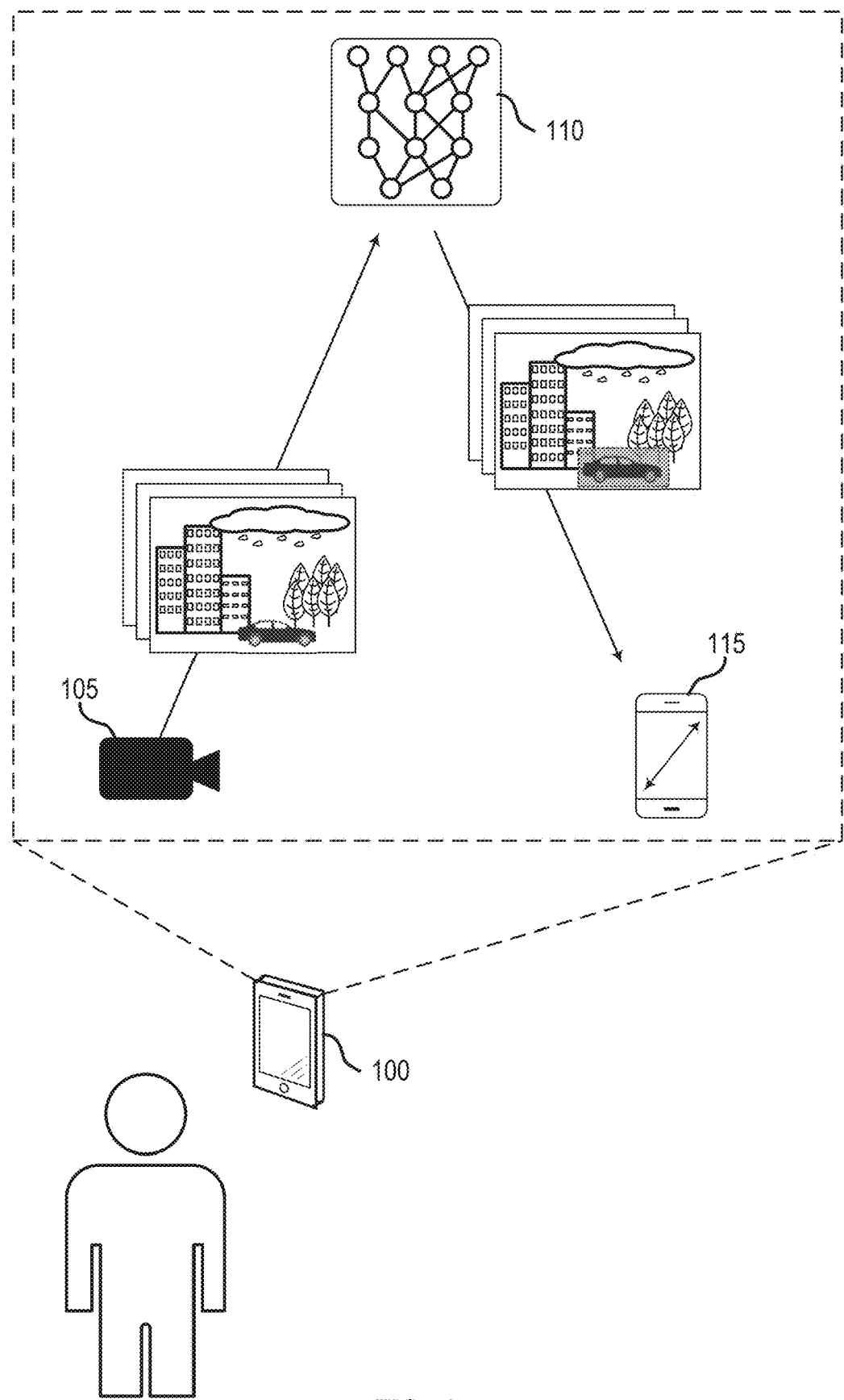
FIG. 1 shows an example of a system for video processing according to aspects of the present disclosure.

Digital cameras may use image sensors (e.g., to capture images) and image signal processing techniques (e.g., to process the captured images). For instance, image processing techniques that may be performed on captured images include image sharpening, noise reduction, color control, image segmentation, and object detection, among various other specialized tasks.

Many computer vision and image processing tasks may leverage neural networks. Such machine learning-based techniques may provide high accuracy results for various computer vision and image processing tasks. However, some applications implementing artificial neural networks (e.g., real-time video applications leveraging deep neural networks) may require significant system resources such as complex computational capabilities, increased computational hardware, increased memory, increased power consumption, etc. In some cases, such resources may be unavailable on certain resource limited devices, such as mobile phones, cameras, etc.

In some cases, video sequences may contain a high level of temporal/spatial redundancy. For instance, some portions (e.g., large portions) of a scene (e.g., objects & background) may not significantly change between adjacent frames of a video sequence, nearby image pixels are usually similar across sequential frames of a video sequence, etc. Further, for computer vision tasks, objects of interest may comprise (e.g., take) only a small fraction of the video frames, such that changes in the image that do not carry task-related information may not propagate to deep layers.

Some conventional neural networks may process an entire video frame-by-frame, without exploiting inherent time & spatial sparsity. In other cases, techniques may attempt to exploit the temporal redundancy in slow-changing signals to reduce computations. However, such techniques may be inefficient (e.g., at the expense of significant increases in memory requirements, increases in hardware area, increases in power requirements, etc.). As such, conventional solutions may be inefficient, or infeasible, for applications (e.g., such as for accurate, real-time neural network video task applications) on devices such as mobile phones, cameras, and other resource limited devices (e.g., memory limited devices, area limited devices, power limited devices, etc.).

One or more aspects of the present disclosure enable high accuracy computer vision and image processing techniques with decreased system resource requirements (e.g., with decreased computational load, shallower neural network designs, etc.). As described in more detail herein, one or more aspects of the described techniques may leverage key layers (e.g., certain key layers of a neural network) and compressed tensor comparisons to efficiently exploit temporal redundancy in videos and other slow changing signals (e.g., to efficiently reduce neural network inference computational burden, with only minor increase in data transfer power consumption). For example, key layers of a neural network may be identified, and temporal/spatial redundancy across frames may be efficiently leveraged such that only a computation region in a subsequent frame n+1 is re-computed in layers between identified key layers, while remaining feature-map calculations may be disabled in the layers between the identified key layers. Additionally or alternatively, instead of reading and writing of the projection tensors (e.g., convolution results) for every layer and every frame in a video processing application, a convolutional neural network (CNN) may implement tensor compression techniques to efficiently reduce data transfer bandwidth. For instance, a lossy-compressed version of a projection tensor may be stored in memory and used for certain convolution operations performed in tiles small enough for in-place computations in memory, as described in more detail herein.

Embodiments of the present disclosure may be used in various contexts, such as in an image (e.g., a video) processing system. For example, an image processing apparatus (e.g., a camera) based on the present disclosure may implement storage and usage of compressed tensors (e.g., compressed convolution results) to reduce computation complexity and data transfer bandwidth of neural network applications, as described in more detail below. Further, an image processing apparatus based on the present disclosure may leverage key layers to reduce feature-map calculations of neural network applications, according to techniques described herein. One or more aspects of the inventive concept in the image processing context is provided with reference to FIGS. 1 and 2. Details regarding example image processing processes are provided with reference to FIGS. 3 and 4. Further, example tensor compression processes are provided with reference to FIGS. 5 and 6, and example image processing techniques leveraging key layers are described with reference to FIGS. 7 and 8.

System Architecture

FIG. 1 shows an example of a system for video processing according to aspects of the present disclosure. Video processing apparatus 100 is an example of, or includes aspects of, the corresponding element described with reference to FIG. 2. In one aspect, video processing apparatus 100 includes camera 105, ML model 110, and display 115. In some examples, a user may use video processing apparatus 100 to perform one or more image processing tasks (e.g., such as object detection tasks for a video frame sequence). Camera 105 is an example of, or includes aspects of, the corresponding element described with reference to FIG. 2. ML model 110 is an example of, or includes aspects of, the corresponding element described with reference to FIG. 2. Display 115 is an example of, or includes aspects of, the corresponding element described with reference to FIG. 2.

Generally, video processing apparatus 100 may perform tasks such as computer vision tasks, image processing tasks, etc. In the example of FIG. 1, video processing apparatus 100 may perform object detection tasks (e.g., for a video frame sequence) to output an annotated video. For instance, in the example of FIG. 1, video processing apparatus 100 may capture or receive a video (e.g., a sequence of frames) via camera 105. The video processing apparatus 100 may perform computer vision/image processing tasks, via ML model 110, according to the techniques described herein, and output an annotated video with an object (e.g., a vehicle) indicated via an object bounding box.

As described in more detail below, for example, with reference to FIGS. 4 through 6, ML model 110 may implement storage and usage of compressed tensors (e.g., compressed convolution results) to reduce computation complexity and data transfer bandwidth required by ML model 110 for various computer vision and image processing tasks. Additionally or alternatively, ML model 110 may leverage key layers of the ML model 110, in addition to temporal/spatial redundancy across frames, to reduce feature-map calculations performed by the ML model 110 for various computer vision and image processing tasks (e.g., as described in more detail below, for example, with reference to FIGS. 4, 7, and 8).

FIG. 1 illustrates an example system and video processing apparatus 100 for implementing one or more aspects of low-power change-based neural network inference techniques described herein, which may provide for more accurate computer vision and image processing applications while using reduced system resource requirements (e.g., reduced computational load, shallower neural network designs, etc.).

One or more aspects of the present disclosure may be applied in various technical fields, such as image processing, computer vision, etc. For instance, described apparatuses and techniques may enable efficient object detection in video applications, internet of things (IoT) applications, automatic surveillance systems, smart/autonomous vehicles, mobile cameras, robots, augmented reality (AR) applications, virtual reality (VR) applications, etc. In some cases, computer vision and image processing techniques may be based on (e.g., or implement) deep neural networks that may demand significant computational resources. The present disclosure may enable engines (e.g., processing system hardware) to process video streams more efficiently, using limited (e.g., or reduced) computational resources.

A video processing apparatus 100 generally includes any computing device, such as a personal computer, laptop computer, mainframe computer, palmtop computer, personal assistant, mobile device, smartphone, tablet computer, wearable device, or any other suitable processing apparatus. In some aspects, a video processing apparatus 100 may include an optical instrument (e.g., an image sensor, camera 105, etc.) for recording or capturing images, which may be stored locally, transmitted to another location, etc. For example, a camera 105 may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the video processing apparatus 100. In a camera 105, image sensors may convert light incident on a camera 105 lens into an analog or digital signal. Video processing apparatus 100 may then display a video (e.g., an annotated video with object tracking) on display 115 (e.g., a display panel) based on the digital signal.

For example, a pixel (e.g., a pixel sensor of a camera 105) may store information about received electromagnetic radiation (e.g., light). Each pixel may include one or more photodiodes and one or more complementary metal oxide semiconductor (CMOS) transistors. A photodiode may receive a light and may output charges. The amount of output charges may be proportional to the amount of light received by the photodiode. CMOS transistors may output a voltage based on charges output from the photodiode. A level of a voltage output from a photodiode may be proportional to the amount of charges output from the photodiode. That is, a level of a voltage output from a photodiode may be proportional to the amount of light received by the photodiode.

In some examples, video processing apparatus 100 may be implemented for computer vision/image processing tasks in a VR context. VR is a computer technology that generates an artificial sensory environment for a user (e.g., via display 115). In some cases, VR systems use virtual reality headsets, sometimes in combination with physical spaces or multi-projected environments, to generate realistic images, sounds and other sensations that simulates a user's physical presence in a virtual or imaginary environment. A person using virtual reality equipment is able to "look around" the artificial world, and with high quality VR move about in it and interact with virtual features or items. VR headsets are head-mounted goggles with a screen in front of the eyes. Virtual reality also refers to remote communication environments which provide a virtual presence of users with through telepresence and telexistence or the use of a virtual artifact (VA). Augmented reality systems may also be considered a form of VR that layers virtual information over a live camera feed (e.g., via camera 105) into a headset, or through a smartphone or tablet device. Modern VR displays may be based on technology developed for smartphones including: gyroscopes and motion sensors for tracking head, hand, and body positions; small HD screens for stereoscopic displays; and small, lightweight and fast processors. Production of VR images and video may be facilitated by the use of omnidirectional cameras 105, also known as 360-degree cameras or VR cameras, that have the ability to record in all directions, although at low-resolutions or in highly compressed formats for online streaming. In contrast, photogrammetry is increasingly used to combine several high-resolution photographs for the creation of detailed 3D objects and environments in VR applications.

A display 115 may comprise a conventional monitor, a monitor coupled with an integrated display 115, an integrated display 115 (e.g., an LCD display 115), or other means for viewing associated data or processing information. Output devices other than the display 115 can be used, such as printers, other computers or data storage devices, and computer networks.

A neural network (e.g., a ML model 110) is a type of computer algorithm that is capable of learning specific patterns without being explicitly programmed, but through iterations over known data. ML model 110 may refer to a cognitive model that includes input nodes, hidden nodes, and output nodes. Nodes in the ML model 110 may have an activation function that computes whether the node is activated based on the output of previous nodes. Training the system may involve supplying values for the inputs, and modifying edge weights and activation functions (algorithmically or randomly) until the result closely approximates a set of desired outputs.

Figure 2:
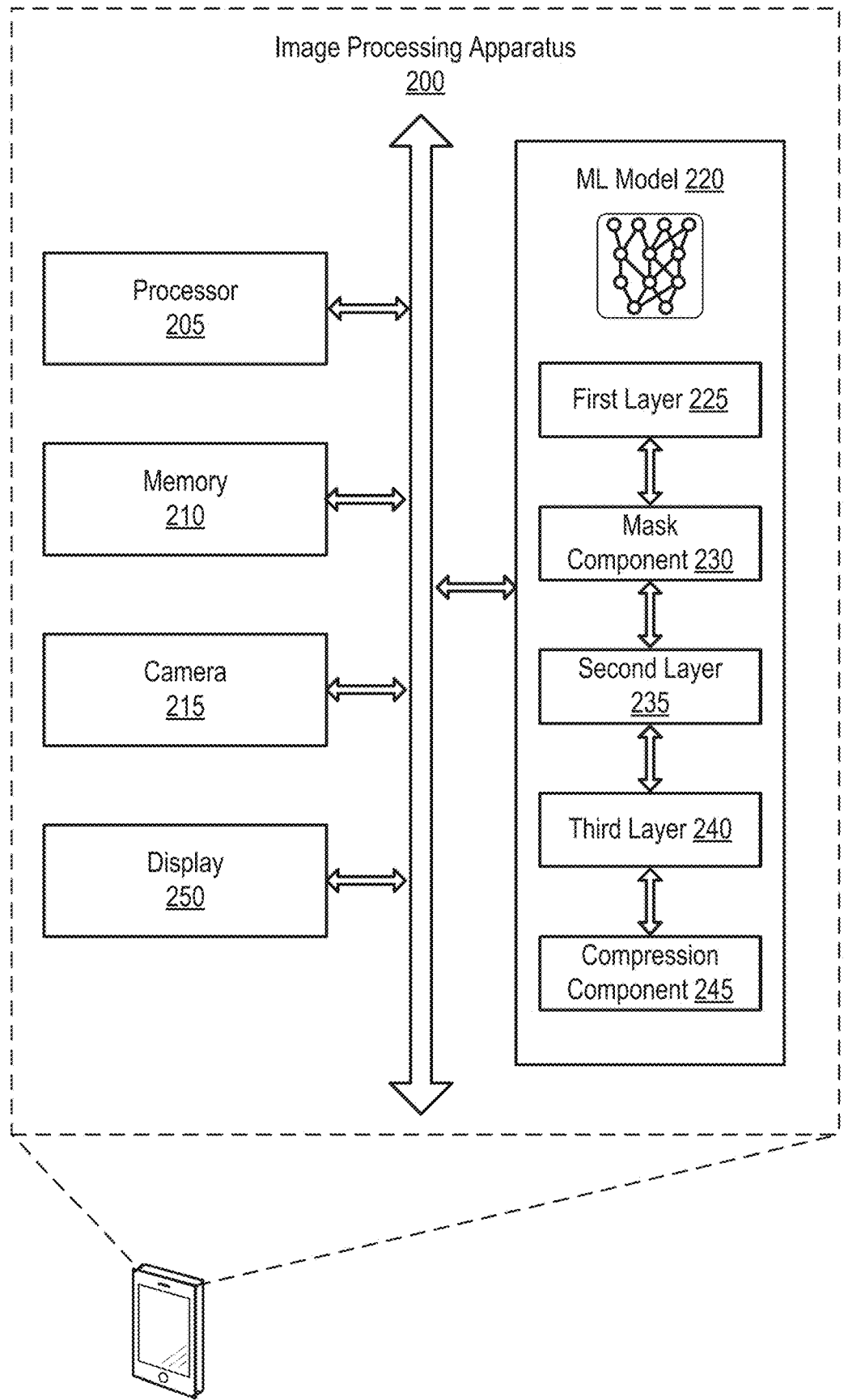
FIG. 2 shows an example of a video processing apparatus according to aspects of the present disclosure.

FIG. 2 shows an example of a video processing apparatus 200 according to aspects of the present disclosure. Video processing apparatus 200 is an example of, or includes aspects of, the corresponding element described with reference to FIG. 1. Video processing apparatus 200 may leverage key layers (e.g., certain key layers of ML model 220) and compressed tensor comparisons to efficiently exploit temporal redundancy in videos and other slow changing signals (e.g., to efficiently reduce ML model 220 inference computational burden, with only minor increase in data transfer power consumption). In one aspect, video processing apparatus 200 includes processor 205, memory 210, camera 215, ML model 220, and display 250. Camera 215, ML model 220, and display 250 are each examples of, or each include aspects of, their corresponding elements described with reference to FIG. 1.

A processor 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 205 is configured to operate memory 210 (e.g., a memory array) using a memory controller. In other cases, a memory controller is integrated into the processor 205. In some cases, the processor 205 is configured to execute computer-readable instructions stored in a memory 210 to perform various functions. In some embodiments, a processor 205 includes special purpose components for modem processing, baseband processing, digital signal processing, or transmission processing.

Examples of a memory 210 device include random access memory (RAM), read-only memory (ROM), or a hard disk. Examples of memory 210 devices include solid state memory and a hard disk drive. In some examples, memory 210 is used to store computer-readable, computer-executable software including instructions that, when executed, cause a processor 205 to perform various functions described herein. In some cases, the memory 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 210 store information in the form of a logical state.

In some aspects, video processing apparatus 200 may implement software. Software may include code to implement aspects of the present disclosure. Software may be stored in a non-transitory computer-readable medium such as system memory 210 or other memory 210. In some cases, the software may not be directly executable by the processor 205 but may cause a computer (e.g., when compiled and executed) to perform functions described herein.

In some aspects, ML model 220 may include, or implement aspects of, an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some aspects, ML model 220 may include, or implement aspects of, a CNN. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In a neural network, an activation function may be used to transforming summed weighted inputs from a node into the activation of the node or an output. A ReLU layer may implement a rectified linear activation function, which comprises a piecewise linear function that outputs the input directly if is positive, otherwise, it outputs zero. A rectified linear activation function may be used as a default activation function for many types of neural networks. Using a rectified linear activation function may enable the use of stochastic gradient descent with backpropagation of errors to train deep neural networks. The rectified linear activation function may operate similar to a linear function, but it may enable complex relationships in the data to be learned. The rectified linear activation function may also provide more sensitivity to the activation sum input to avoid saturation. A node or unit that implements a rectified linear activation function may be referred to as a rectified linear activation unit, or ReLU for short. Networks that use a rectifier function for hidden layers may be referred to as rectified networks.

According to some aspects, camera 215 receives a video including a set of video frames.

According to some aspects, ML model 220 computes a first projection matrix by performing a first convolution operation on first input features of a first frame from the set of video frames at a first layer of neural network. In some examples, ML model 220 compress the first projection matrix to obtain a first compressed projection matrix. In some examples, ML model 220 computes a second projection matrix by performing the first convolution operation on second input features of a second frame of the set of video frames at the first layer. In some examples, ML model 220 compress the second projection matrix to obtain a second compressed projection matrix.

According to some aspects, memory 210 is configured to store the first projection matrix, the first compressed projection matrix, the second projection matrix, the second compressed projection matrix, or any combination thereof (e.g., as described in more detail below, for example, with reference to FIG. 6).

In some examples, ML model 220 compares the first projection matrix to the second projection matrix to obtain a projection mask. According to some aspects, ML model 220 compares the first compressed projection matrix to the second compressed projection matrix to obtain a projection mask. In some examples, ML model 220 computes a third projection matrix by performing a second convolution operation on a first portion of third input features of the second frame at a second layer of the neural network based on the projection mask. In some examples, ML model 220 generates label data for the video based on the third projection matrix.

In one aspect, ML model 220 includes first layer 225, mask component 230, second layer 235, third layer 240, and compression component 245.

According to some aspects, first layer 225 is configured to compute a first projection matrix by performing a first convolution operation on first input features of a first frame from a plurality of video frames, and to compute a second projection matrix by performing the first convolution operation on second input features of a second frame of the plurality of video frames at the first layer 225. According to some aspects, mask component 230 is configured to generate a projection mask by comparing the first projection matrix to the second projection matrix. According to some aspects, second layer 235 is configured to compute a third projection matrix by performing a second convolution operation on a first portion of third input features of the second frame at based on the projection mask. According to some aspects, compression component 245 is configured to compress the first projection matrix to obtain a first compressed projection matrix, and the to compress the second projection matrix to obtain a second compressed projection matrix.

In some aspects, the projection mask indicates that parameters of the second projection matrix corresponding to the first portion have more than or equal to a threshold difference from corresponding parameters of the first projection matrix. In some examples, ML model 220 refrains from performing the second convolution operation on a second portion of the third input features based on the projection mask, where the projection mask indicates that parameters of the second projection matrix corresponding to the second portion have less than or equal to a threshold difference from corresponding parameters of the first projection matrix. In some examples, ML model 220 performs the second convolution operation on parameters of the first projection matrix corresponding to the second portion based on the projection mask. In some examples, ML model 220 determines that a third layer of the neural network is a key layer. In some examples, ML model 220 uses output features of the third layer from the first frame as input for a fourth layer of the neural network based on the determination. In some examples, ML model 220 identifies a set of key layers of the neural network, where the determination is based on the set of key layers (e.g., as further described herein, for example, with reference to FIGS. 7 and 8).

In some examples, ML model 220 performs a first non-linear activation operation on the first projection matrix to obtain first output features of the first layer of the neural network for the first frame. In some examples, ML model 220 performs a first non-linear activation operation on the second projection matrix to obtain second output features of the first layer of the neural network for the second frame. In some aspects, the first convolution operation includes a linear operation. In some examples, ML model 220 stores the first compressed projection matrix in memory during processing of the first frame. In some examples, ML model 220 retrieves the first compressed projection matrix from the memory during processing of the second frame to perform the comparing. In some examples, ML model 220 stores the first projection matrix in memory during processing of the first frame. In some examples, ML model 220 retrieves the first projection matrix from the memory during processing of the second frame to compute the third projection matrix.

Video Processing

Figure 3:
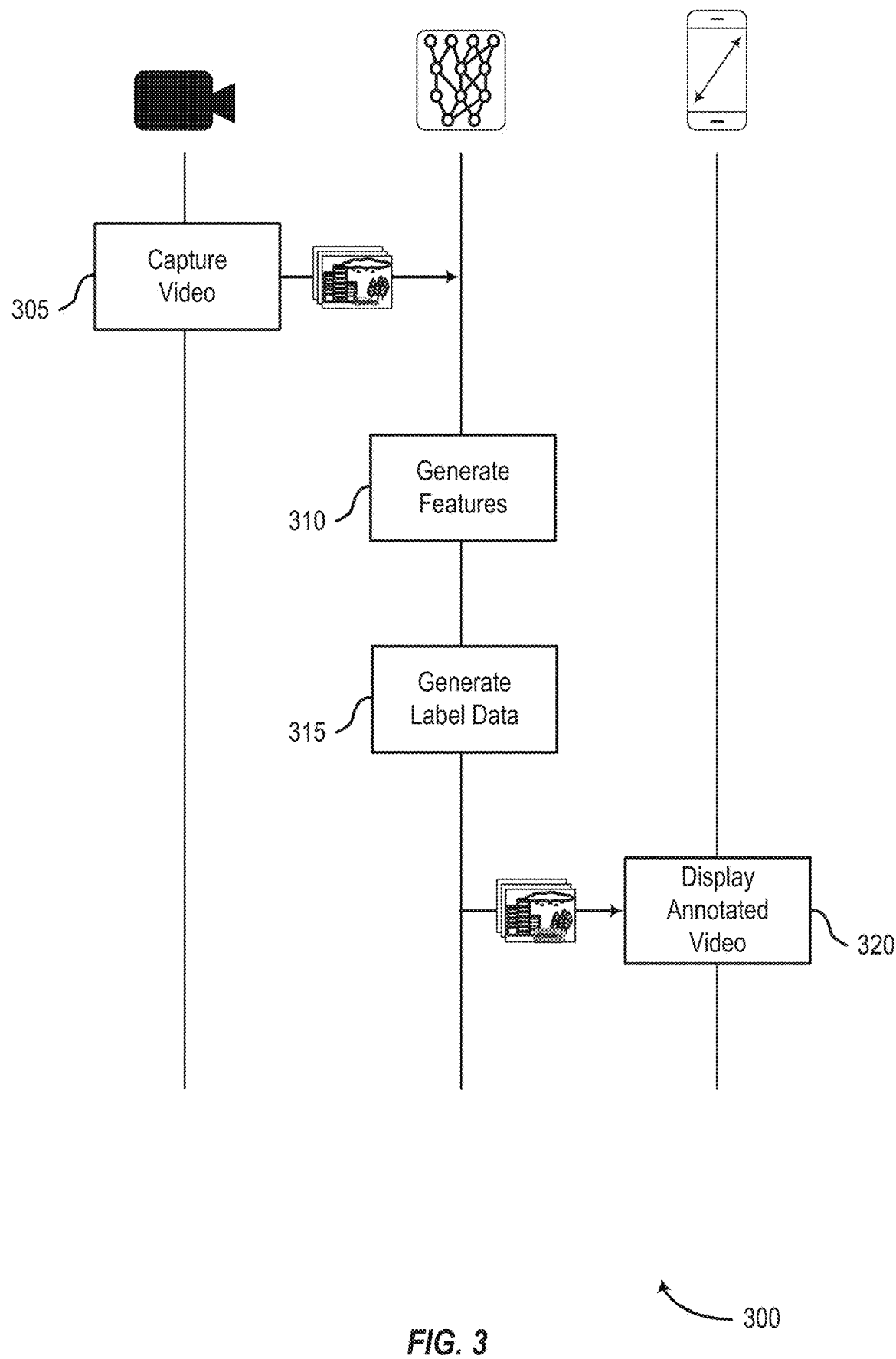
FIG. 3 shows an example of a process for video processing according to aspects of the present disclosure.

FIG. 3 shows an example of a process 300 for video processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Process 300 generally illustrates operations performed by a video processing apparatus including a camera, a ML model, and a display (e.g., which may each be examples of respective components described with reference to FIGS. 1 and 2). For instance, in the example of FIG. 3, a camera may capture a video (e.g., a sequence of frames), and a ML model may perform one or more aspects of the techniques described herein to output an annotated video for display (e.g., an annotated video tracking an object such as a vehicle, for example, as shown in FIG. 3).

At operation 305, the system captures a video (e.g., a sequence of image frames). In some examples, the video may be received in digital form from another device. In other examples, the video may be captured as a series of image frames captured by a camera of a surrounding environment. For instance, in some cases, the operations of this step refer to, or may be performed by, a camera as described with reference to FIGS. 1 and 2.

At operation 310, the system generates features in frames of the captured video (e.g., by performing a convolution operations on input features of frames in the capture video). For example, the system may perform convolution operations on input features of frames of the video to generate features, as described in more detail with reference to FIG. 4. In some aspects, instead of reading and writing of the projection tensors (e.g., convolution results) for every layer and every frame in the captured video, the system may implement tensor compression techniques to efficiently reduce data transfer bandwidth (e.g., as described in more detail herein, for example, with reference to FIGS. 5 and 6). In some cases, the operations of this step refer to, or may be performed by, a processor as described with reference to FIG. 2. In some cases, the operations of this step refer to, or may be performed by, a ML model as described with reference to FIGS. 1 and 2.

At operation 315, the system generates label data from the generated features (e.g., based on computed projection matrices). In some aspects, the label data may be generated by decoding features encoded at operation 310. In some cases, the operations of this step refer to, or may be performed by, a processor as described with reference to FIG. 2. In some cases, the operations of this step refer to, or may be performed by, a ML model as described with reference to FIGS. 1 and 2.

At operation 320, the system displays an annotated video based on the generated label data. For instance, in the example of FIG. 3, the system may generate and display the captured video annotated with object tracking features, such as displaying a vehicle indicated inside of an object bounding box. In some cases, the operations of this step refer to, or may be performed by, a display as described with reference to FIGS. 1 and 2.

Figure 4:
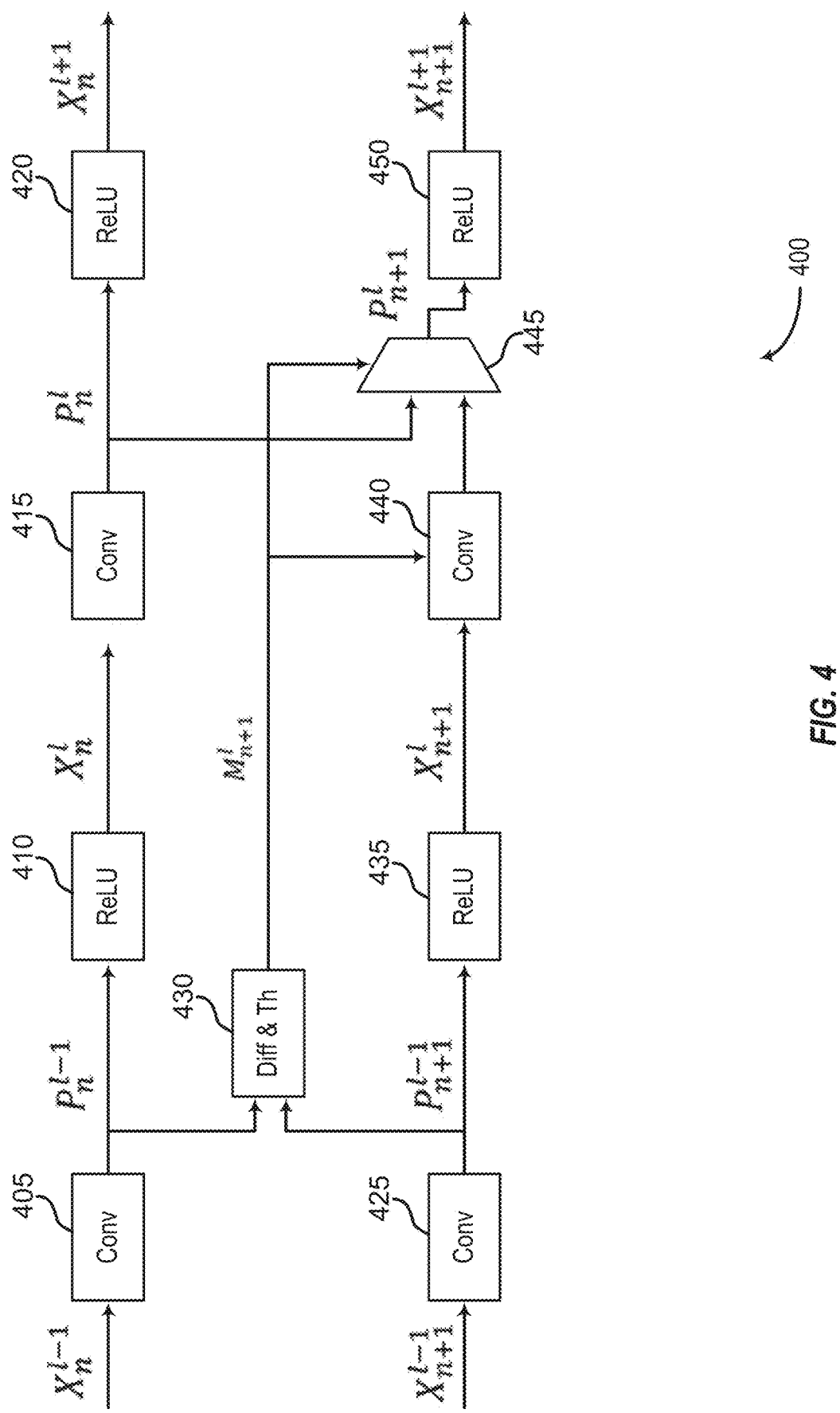
FIG. 4 shows an example of a process for encoding input features according to aspects of the present disclosure.

FIG. 4 shows an example of a process 400 for encoding input features according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Process 400 illustrates one or more aspects of a ML model (e.g., a neural network, such as a CNN that compares the difference between tensors at adjacent frames (e.g., to select which elements to re-calculate). Generally, one or more aspects of a CNN may be modeled as:

$$X_n^{l+1} = f(W^l * X_n^l) = f(P_n^l)$$

where $X_n^l$ represents input features or feature maps (e.g., multi-dimensional tensors) of a layer l, for a frame n; where $W^l$ represents convolution kernels for a layer l; where $P_n^l$ represents a projection matrix of a layer l, for a frame n; and where f( ) is a non-linear activation function, and * is the convolution operator.

As another example representation:

$$X_n^l \rightarrow \text{convolution operation (Conv)} \rightarrow P_n^l \rightarrow \text{activation operation (ReLU)} \rightarrow X_n^{l+1}$$

where $X_n^l$ and $P_n^l$ are tensors made of per pixel (e.g., for the case of visual signal) vectors $X_n^l(p)$ and $P_n^l(p)$. By storing $W^l * X_n^l$ in memory (e.g., as described in more detail herein, for example, with reference to FIG. 6), a binary, per pixel, "change-mask" $M_n^l$ (e.g., a projection mask) may be calculated as:

$$M_n^l(p) = g(P_n^l(p), P_{n-1}^l(p)) \in [0,1]$$

where g can be any binary function. Examples for g can be thresholding on familiar metrics such as $l_\infty$, in such a case:

$$M_n^l(p) = [\|P_n^l(p) - P_{n-1}^l(p)\|_\infty > Th]_{l_1, l_2}$$

or g can be some function learned and implemented by a separate policy neural network, or any other binary function.

Such a projection mask ($M_n^l$) may then be used to skip unnecessary calculations (e.g., in layer l+1). For instance:

$$P_{n+1}^l(p) = \begin{cases} W^l * X_{n+1}^l(p), & M_{n+1}^l(p) = 1 \\ P_n^l(p), & M_{n+1}^l(p) = 0 \end{cases}$$

For instance, at operation 405, the system may perform a convolution operation (e.g., a Conv operation) on input features ($X_n^{l-1}$) of a frame n at a layer l-1 of a ML model to obtain a projection matrix ($P_n^{l-1}$). In some cases, the operations of this step refer to, or may be performed by, a ML model as described with reference to FIGS. 1 and 2.

At operation 410, the system performs an activation operation (e.g., a non-linear activation operation or a ReLU operation) on the projection matrix ($P_n^{l-1}$) to obtain output features ($X_n^l$), where $X_n^l$ may be taken as input features to the subsequent layer l. In some cases, the operations of this step refer to, or may be performed by, a ML model as described with reference to FIGS. 1 and 2.

At operation 415, the system performs a convolution operation on input features ($X_n^l$) of a frame n at a layer l of a ML model to obtain a projection matrix ($P_n^l$). In some cases, the operations of this step refer to, or may be performed by, a ML model as described with reference to FIGS. 1 and 2. In some cases, the operations of this step refer to, or may be performed by, a first layer as described with reference to FIG. 2.

At operation 420, the system performs an activation operation on the projection matrix ($P_n^l$) to obtain output features ($X_n^{l+1}$). In some cases, the operations of this step refer to, or may be performed by, a ML model as described with reference to FIGS. 1 and 2.

At operation 425, the system performs a convolution operation on input features ($X_{n+1}^{l-1}$) of a next frame (frame n+1) at a layer l-1 of a ML model to obtain a projection matrix ($P_{n+1}^{l-1}$). In some cases, the operations of this step refer to, or may be performed by, a ML model as described with reference to FIGS. 1 and 2.

At operation 430, the system performs a comparison operation (e.g., comparing the output of operations 405 and 425) to obtain a projection mask ($M_{n+1}^l$). In some cases, the operations of this step refer to, or may be performed by, a ML model as described with reference to FIGS. 1 and 2. In some cases, the operations of this step refer to, or may be performed by, a mask component as described with reference to FIG. 2.

At operation 435, the system performs an activation operation on the projection matrix ($P_{n+1}^{l-1}$) to obtain output features ($X_{n+1}^l$) In some cases, the operations of this step refer to, or may be performed by, a ML model as described with reference to FIGS. 1 and 2.

At operation 440, the system performs a convolution operation on a portion of input features ($X_{n+1}^l$) of a frame n+1 at a layer l of a ML model based on the projection mask ($M_{n+1}^l$). In some cases, the operations of this step refer to, or may be performed by, a ML model as described with reference to FIGS. 1 and 2.

At operation 445, the system performs a combining operation (e.g., combining the output of operations 415, 440, and 425. In some cases, the operations of this step refer to, or may be performed by, a ML model as described with reference to FIGS. 1 and 2. In some cases, the operations of this step refer to, or may be performed by, a mask component as described with reference to FIG. 2.

At operation 450, the system performs an activation operation on the projection matrix ($P_{n+1}^l$) to obtain output features ($X_{n+1}^{l+1}$). In some cases, the operations of this step refer to, or may be performed by, a ML model as described with reference to FIGS. 1 and 2.

Tensor Compression for Reducing Data Transfer Bandwidth

Figure 5:
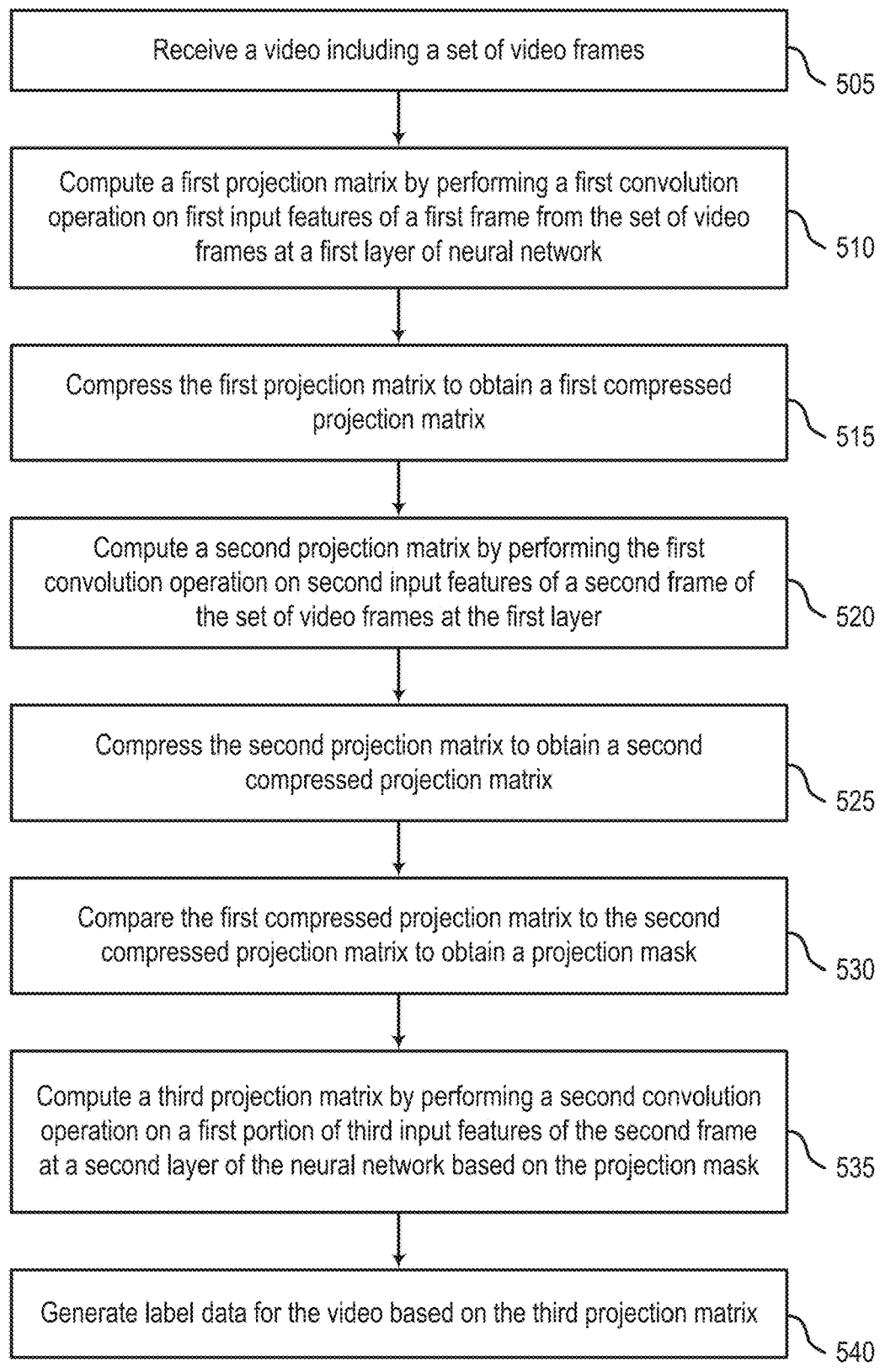
FIG. 5 shows an example of a process for video processing according to aspects of the present disclosure.

FIG. 5 shows an example of a process 500 for video processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Process 500 illustrates techniques for low-power change-based neural network inference for computer vision and image processing tasks. One or more aspects of the techniques described herein allows for efficient exploitation of the temporal redundancy in videos and other slow-changing input signals, while reducing computation with a minimal increase in data transfer power consumption. Such enables running of high-complexity neural network inference for a variety of computer-vision and audio processing tasks, in real-time, on resource-constrained devices (e.g., such as devices in the mobile, wearables and automotive markets).

At operation 505, the system receives a video including a set of video frames. In some cases, the operations of this step refer to, or may be performed by, a camera as described with reference to FIGS. 1 and 2.

At operation 510, the system computes a first projection matrix by performing a first convolution operation on first input features of a first frame from the set of video frames at a first layer of neural network. In some cases, the operations of this step refer to, or may be performed by, a ML model as described with reference to FIGS. 1 and 2. In some cases, the operations of this step refer to, or may be performed by, a first layer as described with reference to FIG. 2.

At operation 515, the system compresses the first projection matrix to obtain a first compressed projection matrix. In some cases, the operations of this step refer to, or may be performed by, a ML model as described with reference to FIGS. 1 and 2. In some cases, the operations of this step refer to, or may be performed by, a compression component as described with reference to FIG. 2.

At operation 520, the system computes a second projection matrix by performing the first convolution operation on second input features of a second frame of the set of video frames at the first layer. In some cases, the operations of this step refer to, or may be performed by, a ML model as described with reference to FIGS. 1 and 2. In some cases, the operations of this step refer to, or may be performed by, a first layer as described with reference to FIG. 2.

At operation 525, the system compresses the second projection matrix to obtain a second compressed projection matrix. In some cases, the operations of this step refer to, or may be performed by, a ML model as described with reference to FIGS. 1 and 2. In some cases, the operations of this step refer to, or may be performed by, a compression component as described with reference to FIG. 2.

At operation 530, the system compares the first compressed projection matrix to the second compressed projection matrix to obtain a projection mask. In some cases, the operations of this step refer to, or may be performed by, a ML model as described with reference to FIGS. 1 and 2. In some cases, the operations of this step refer to, or may be performed by, a mask component as described with reference to FIG. 2.

At operation 535, the system computes a third projection matrix by performing a second convolution operation on a first portion of third input features of the second frame at a second layer of the neural network based on the projection mask. In some cases, the operations of this step refer to, or may be performed by, a ML model as described with reference to FIGS. 1 and 2. In some cases, the operations of this step refer to, or may be performed by, a second layer as described with reference to FIG. 2.

At operation 540, the system generates label data for the video based on the third projection matrix. In some cases, the operations of this step refer to, or may be performed by, a ML model as described with reference to FIGS. 1 and 2.

An apparatus, non-transitory computer readable medium, and system for low-power change-based neural network inference for computer vision and image processing tasks are also described. One or more aspects of the apparatus, non-transitory computer readable medium, and system include receiving a video comprising a plurality of video frames; computing a first projection matrix by performing a first convolution operation on first input features of a first frame from the plurality of video frames at a first layer of neural network; compressing the first projection matrix to obtain a first compressed projection matrix; computing a second projection matrix by performing the first convolution operation on second input features of a second frame of the plurality of video frames at the first layer; compressing the second projection matrix to obtain a second compressed projection matrix; comparing the first compressed projection matrix to the second compressed projection matrix to obtain a projection mask; computing a third projection matrix by performing a second convolution operation on a first portion of third input features of the second frame at a second layer of the neural network based on the projection mask; and generating label data for the video based on the third projection matrix.

In some aspects, the projection mask indicates that parameters of the second projection matrix corresponding to the first portion have more than or equal to a threshold difference from corresponding parameters of the first projection matrix. Some examples of the method, apparatus, non-transitory computer readable medium, and system further include refraining from performing the second convolution operation on a second portion of the third input features based on the projection mask, wherein the projection mask indicates that parameters of the second projection matrix corresponding to the second portion have less than or equal to a threshold difference from corresponding parameters of the first projection matrix. Some examples of the method, apparatus, non-transitory computer readable medium, and system further include performing the second convolution operation on parameters of the first projection matrix corresponding to the second portion based on the projection mask.

Some examples of the method, apparatus, non-transitory computer readable medium, and system further include determining that a third layer of the neural network is a key layer. Some examples further include using output features of the third layer from the first frame as input for a fourth layer of the neural network based on the determination. Some examples of the method, apparatus, non-transitory computer readable medium, and system further include identifying a plurality of key layers of the neural network, wherein the determination is based on the plurality of key layers.

Some examples of the method, apparatus, non-transitory computer readable medium, and system further include performing a first non-linear activation operation on the first projection matrix to obtain first output features of the first layer of the neural network for the first frame. Some examples of the method, apparatus, non-transitory computer readable medium, and system further include performing a first non-linear activation operation on the second projection matrix to obtain second output features of the first layer of the neural network for the second frame. In some aspects, the first convolution operation comprises a linear operation.

Some examples of the method, apparatus, non-transitory computer readable medium, and system further include storing the first compressed projection matrix in memory during processing of the first frame. Some examples further include retrieving the first compressed projection matrix from the memory during processing of the second frame to perform the comparing. Some examples of the method, apparatus, non-transitory computer readable medium, and system further include storing the first projection matrix in memory during processing of the first frame. Some examples further include retrieving the first projection matrix from the memory during processing of the second frame to compute the third projection matrix.

Figure 6:
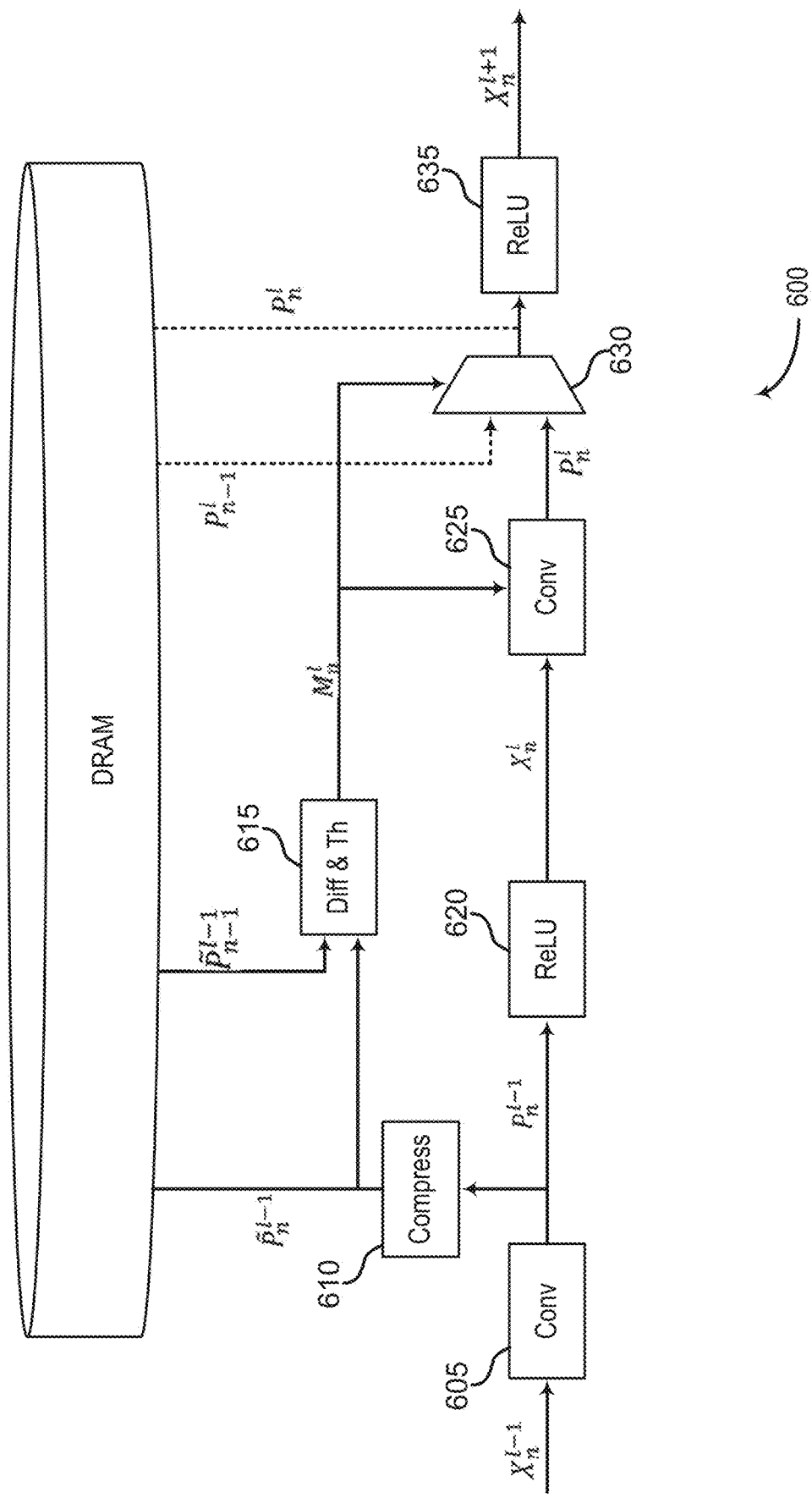
FIG. 6 shows an example of a process for video processing leveraging tensor compression according to aspects of the present disclosure.

FIG. 6 shows an example of a process 600 for video processing leveraging tensor compression according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A naïve solution may demand the reading and writing of the projection tensors P for every layer, every frame. However, FIG. 6 illustrates one or more aspects of described techniques for using compression to reduce data transfer bandwidth. For instance, according to one or more aspects of the techniques described herein, the read bandwidth may be reduced, for example, by calculating a projection mask M based on a lossy-compressed version of the projection tensors, $\tilde{P}$. The compressed version of the projection tensors ($\tilde{P}$) is stored in memory (e.g., in addition to the non-compressed tensor P), for example, at or after operation 610, as described in more detail below.

In some examples, the original (e.g., non-compressed) tensor P may be read only for the regions with M=1 (e.g., dilated to compensate for the convolution receptive field). In some aspects, the compression (e.g., compression operation 610), mask calculation (e.g., MA calculation at operation 615) and convolution operations (e.g., convolution operation 625) may be performed in tiles small enough for in-place computations in memory, such as in static random-access memory (SRAM).

Generally, any suitable tensor compression methods may be used. For example, tensor compression methods such as spatial resolution reduction (e.g., pooling), low bit-width quantization, Cyclic Redundancy Check (CRC), etc. may be implemented.

Accordingly, as described in more detail herein, the write bandwidth may be reduced by more efficiently writing to memory only the regions (e.g., spatial/channels) for which P has been changed.

At operation 605, the system performs a convolution operation on input features $(X_n^{l-1})$ of a frame n at a layer l-1 of a ML model to obtain a projection matrix $(P_n^{l-1})$. In some cases, the operations of this step refer to, or may be performed by, a first layer as described with reference to FIG. 2.

At operation 610, the system performs a compression operation compressing the projection matrix $(P_n^{l-1})$ to obtain a compressed projection matrix $(\tilde{P}_n^{l-1})$. In some cases, the operations of this step refer to, or may be performed by, a compression component as described with reference to FIG. 2.

At operation 615, the system performs a comparison operation comparing a first compressed projection matrix (e.g., a stored compressed projection matrix $\tilde{P}_{n-1}^{l-1}$ of a previous frame) to a second compressed projection matrix (e.g., the projection matrix $\tilde{P}_n^{l-1}$ obtained at operation 610) to obtain a projection mask $(M_n^l)$. In some cases, the operations of this step refer to, or may be performed by, a ML model as described with reference to FIGS. 1 and 2. In some cases, the operations of this step refer to, or may be performed by, a mask component as described with reference to FIG. 2.

At operation 620, the system performs an activation operation on the projection matrix $(P_n^{l-1})$ to obtain output features $(X_n^l)$. In some cases, the operations of this step refer to, or may be performed by, a ML model as described with reference to FIGS. 1 and 2.

At operation 625, the system performs a convolution operation (on a first portion input features $(X_n^l)$ of a frame n at a layer l of a ML model based on the projection mask $(M_n^l)$) to compute a third projection matrix $(P_n^l)$. In some cases, the operations of this step refer to, or may be performed by, a ML model as described with reference to FIGS. 1 and 2. In some cases, the operations of this step refer to, or may be performed by, a second layer as described with reference to FIG. 2.

At operation 630, the system performs a combining operation (e.g., combining the output of operations 615 and 625, as well as stored projection matrix $(P_{n-1}^l)$). In some cases, the operations of this step refer to, or may be performed by, a ML model as described with reference to FIGS. 1 and 2.

In some aspects, the tensor $P_n^l$ may be stored in memory (e.g., represented by the dashed line on the right side of FIG. 6). Specifically, the changes of the tensor $P_n^l$ compared to $P_{n-1}^l$ may be stored in memory (e.g., and aspects of such information may be retrieved, utilized, etc. at operation 635).

At operation 635, the system performs an activation operation on the projection matrix $(P_n^l)$ to obtain output features $(X_n^{l+1})$. In some cases, the operations of this step refer to, or may be performed by, a ML model as described with reference to FIGS. 1 and 2.

Key Layers for Reducing Calculations

Figure 7:
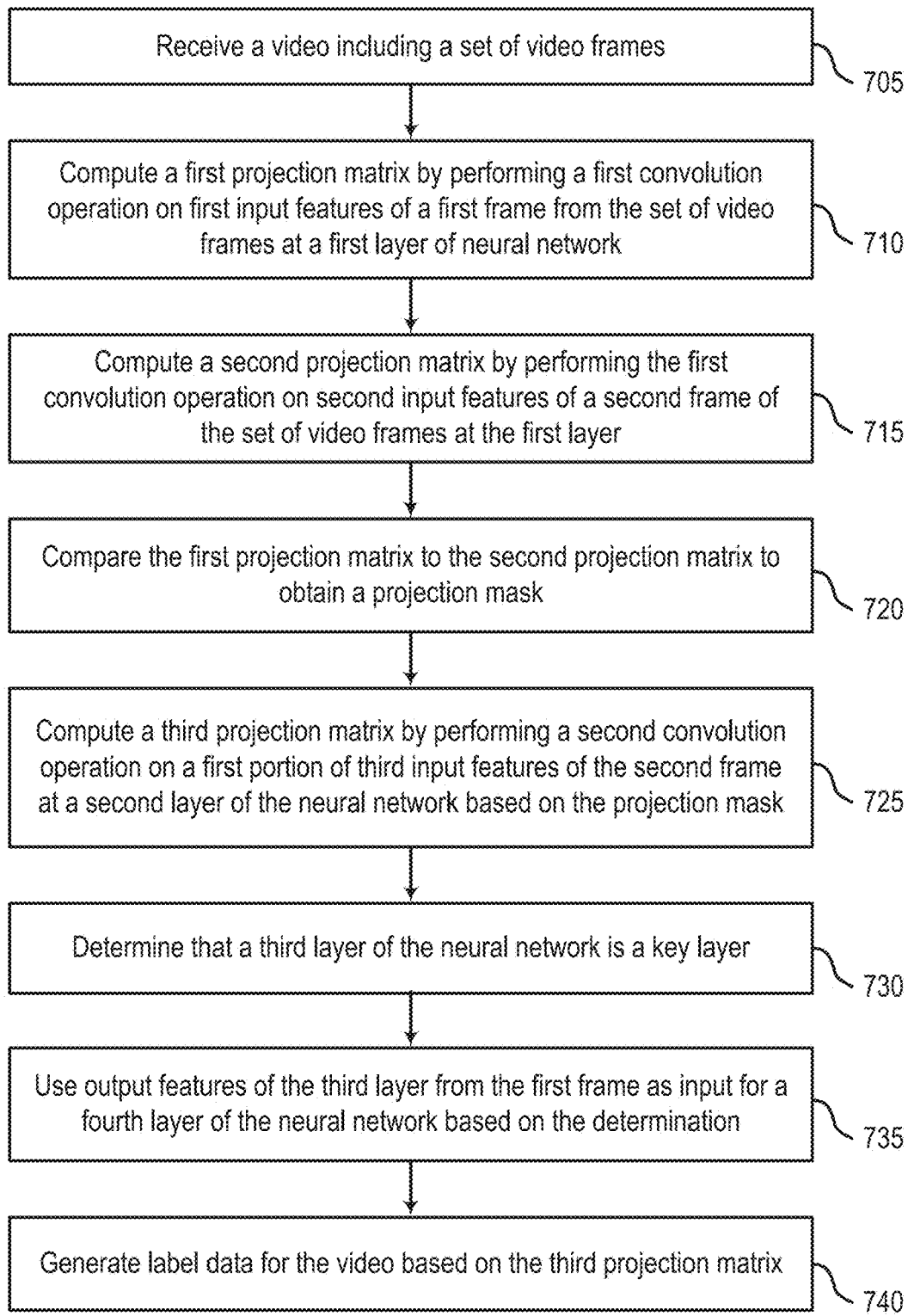
FIG. 7 shows an example of a process for image processing according to aspects of the present disclosure.

FIG. 7 shows an example of a process 700 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A process 700 for low-power change-based neural network inference for computer vision and image processing tasks is described. One or more aspects of the process 700 are shown in operations 705 through 740. As described in more detail herein, aspects of process 700 allows for efficient exploitation of the temporal redundancy in videos and other slow-changing input signals, while reducing computation with a minimal increase in data transfer power consumption.

At operation 705, the system receives a video including a set of video frames. In some cases, the operations of this step refer to, or may be performed by, a camera as described with reference to FIGS. 1 and 2.

At operation 710, the system computes a first projection matrix by performing a first convolution operation on first input features of a first frame from the set of video frames at a first layer of neural network. In some cases, the operations of this step refer to, or may be performed by, a ML model as described with reference to FIGS. 1 and 2. In some cases, the operations of this step refer to, or may be performed by, a first layer as described with reference to FIG. 2.

At operation 715, the system computes a second projection matrix by performing the first convolution operation on second input features of a second frame of the set of video frames at the first layer. In some cases, the operations of this step refer to, or may be performed by, a ML model as described with reference to FIGS. 1 and 2. In some cases, the operations of this step refer to, or may be performed by, a first layer as described with reference to FIG. 2.

At operation 720, the system compares the first projection matrix to the second projection matrix to obtain a projection mask. In some cases, the operations of this step refer to, or may be performed by, a ML model as described with reference to FIGS. 1 and 2. In some cases, the operations of this step refer to, or may be performed by, a mask component as described with reference to FIG. 2.

At operation 725, the system computes a third projection matrix by performing a second convolution operation on a first portion of third input features of the second frame at a second layer of the neural network based on the projection mask. In some cases, the operations of this step refer to, or may be performed by, a ML model as described with reference to FIGS. 1 and 2. In some cases, the operations of this step refer to, or may be performed by, a second layer as described with reference to FIG. 2.

At operation 730, the system determines that a third layer of the neural network is a key layer. In some cases, the operations of this step refer to, or may be performed by, a ML model as described with reference to FIGS. 1 and 2. In some cases, the operations of this step refer to, or may be performed by, a third layer as described with reference to FIG. 2.

At operation 735, the system uses output features of the third layer from the first frame as input for a fourth layer of the neural network based on the determination. In some cases, the operations of this step refer to, or may be performed by, a ML model as described with reference to FIGS. 1 and 2. In some cases, the operations of this step refer to, or may be performed by, a third layer as described with reference to FIG. 2.

At operation 740, the system generates label data for the video based on the third projection matrix. In some cases, the operations of this step refer to, or may be performed by, a ML model as described with reference to FIGS. 1 and 2.

An apparatus, non-transitory computer readable medium, and system for low-power change-based neural network inference for computer vision and image processing tasks are also described. One or more aspects of the apparatus, non-transitory computer readable medium, and system include receiving a video comprising a plurality of video frames; computing a first projection matrix by performing a first convolution operation on first input features of a first frame from the plurality of video frames at a first layer of neural network; computing a second projection matrix by performing the first convolution operation on second input features of a second frame of the plurality of video frames at the first layer; comparing the first projection matrix to the second projection matrix to obtain a projection mask; computing a third projection matrix by performing a second convolution operation on a first portion of third input features of the second frame at a second layer of the neural network based on the projection mask; determining that a third layer of the neural network is a key layer; using output features of the third layer from the first frame as input for a fourth layer of the neural network based on the determination; and generating label data for the video based on the third projection matrix.

Some examples of the method, apparatus, non-transitory computer readable medium, and system further include compressing the first projection matrix to obtain a first compressed projection matrix. Some examples further include compressing the second projection matrix to obtain a second compressed projection matrix, wherein the comparison is between the first compressed projection matrix and the second compressed projection matrix. Some examples of the method, apparatus, non-transitory computer readable medium, and system further include performing the second convolution operation on parameters of the first projection matrix corresponding to the second portion based on the projection mask.

Some examples of the method, apparatus, non-transitory computer readable medium, and system further include refraining from performing the second convolution operation on a second portion of the third input features based on the projection mask, wherein the projection mask indicates that parameters of the second projection matrix corresponding to the second portion have less than or equal to a threshold difference from corresponding parameters of the first projection matrix. Some examples of the method, apparatus, non-transitory computer readable medium, and system further include storing the first projection matrix in memory during processing of the first frame. Some examples further include retrieving the first projection matrix from the memory during processing of the second frame to compute the third projection matrix.

Figure 8:
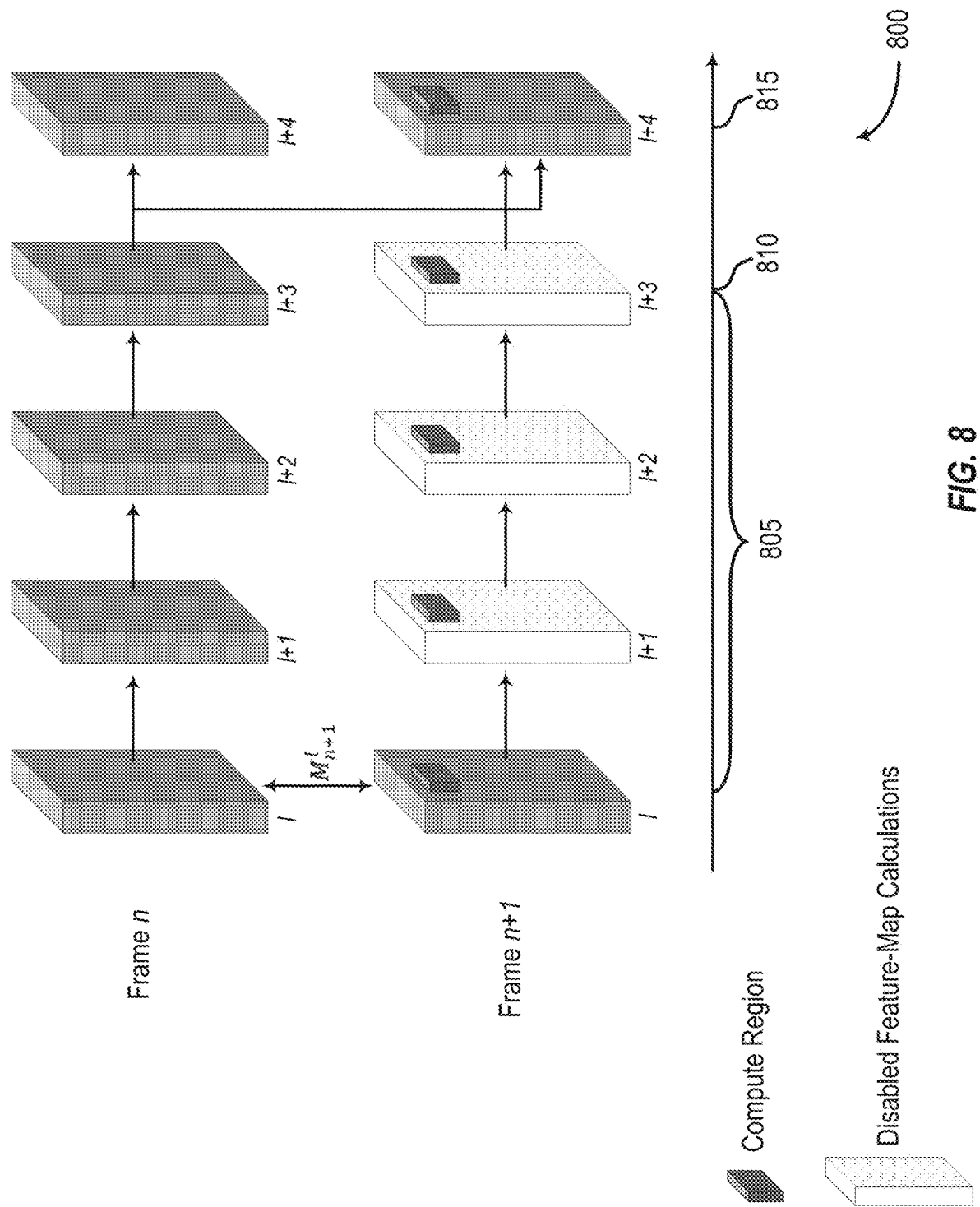
FIG. 8 shows an example of a process for image processing leveraging key layers according to aspects of the present disclosure.

FIG. 8 shows an example of a process 800 for image processing leveraging key layers according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to techniques described herein, a sub-set of layers may be determined (e.g., defined) as key-layers, for which a projection matrix P is stored as shown and the change-mask is computed. In between key-layers, the mask from the nearest preceding key-layers is used. In the example of FIG. 8, layers l and (l+3) are key-layers. According to the mask from layer l, the computation region in frame n+1 is re-computed in layers (l+1), (l+2), (l+3), while the rest of feature-map calculations are disabled (e.g., in the disabled computation region), and taken from l+3 in frame n.

At operation(s) 805, the system passes output features from a first layer from layer to layer (e.g., while only computing according to a compute region and while disabling remaining feature-map calculations). In some cases, the operations of this step refer to, or may be performed by, a ML model as described with reference to FIGS. 1 and 2. In some cases, the operations of this step refer to, or may be performed by, a first layer as described with reference to FIG. 2.

At operation 810, the system determines that a third layer of the neural network is a key layer. In some cases, the operations of this step refer to, or may be performed by, a ML model as described with reference to FIGS. 1 and 2. In some cases, the operations of this step refer to, or may be performed by, a third layer as described with reference to FIG. 2.

At operation 815, the system uses output features of the third layer from the first frame as input for a fourth layer of the neural network. In some cases, the operations of this step refer to, or may be performed by, a ML model as described with reference to FIGS. 1 and 2.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving a video comprising a plurality of video frames including a first frame and a second frame;
identifying a set of key layers of a neural network including a first layer and a third layer and excluding a second layer between the first layer and the third layer;
computing a first projection matrix by performing a first convolution operation on the first frame at the first layer;
computing a second projection matrix for the first frame at the second layer;
computing a third projection matrix by performing the first convolution operation on the second frame at the first layer;
computing a projection mask indicating a computation region for the second frame based on the first projection matrix, the third projection matrix, and the first layer being included in the set of key layers;
disabling a first calculation and performing a second calculation at the second layer based on the third projection matrix, the projection mask, and the second layer being excluded from the set of key layers;
computing a fourth projection matrix for the second frame based on the second projection matrix for the first frame, the projection mask, a result of the second calculation from the second layer, and the third layer being included in the set of key layers; and
generating label data for the video based on the fourth projection matrix, wherein the label data includes object tracking data for the first frame and the second frame.

2. The method of claim 1, wherein:
the projection mask indicates regions where parameters of the third projection matrix have more than or equal to a threshold difference from corresponding parameters of the first projection matrix.

3. The method of claim 1, further comprising:
selecting parameters used as input to the third layer from the second projection matrix and the third projection matrix based on the projection mask, wherein the projection mask indicates regions where parameters of the third projection matrix have less than or equal to a threshold difference from corresponding parameters of the first projection matrix.

4. The method of claim 1, further comprising:
determining that a fourth layer of the neural network is a key layer; and
using output features of the third layer from the first frame as input for the second frame to the fourth layer of the neural network based on the determination that the third layer and fourth layer are key layers, wherein one or more layers of the neural network are present between the third layer and the fourth layer which are not key layers.

5. The method of claim 1, further comprising:
performing a first non-linear activation operation on the first projection matrix to obtain first output features of the first layer of the neural network for the first frame.

6. The method of claim 1, further comprising:
performing a first non-linear activation operation on the second third projection matrix to obtain second output features of the first layer of the neural network for the second frame.

7. The method of claim 1, wherein:
the first convolution operation comprises a linear operation.

8. The method of claim 1, further comprising:
compressing the first projection matrix to generate a first compressed projection matrix which has fewer parameters than the first projection matrix;
storing the first compressed projection matrix in memory during processing of the first frame; and
retrieving the first compressed projection matrix from the memory during processing of the second frame to perform the comparing.

9. The method of claim 1, further comprising:
storing the first projection matrix in memory during processing of the first frame; and
retrieving the first projection matrix from the memory during processing of the second frame to compute the fourth projection matrix.

10. A method comprising:
receiving a video comprising a plurality of video frames;
determining that a first layer and a second layer of a neural network are in a set of key layers;
determining that a set of non-key layers comprises one or more layers of the neural network between the first layer and the second layer;
computing a first projection matrix by performing a first convolution operation on first input features of a first frame from the plurality of video frames at a first layer of neural network;
computing a second projection matrix by performing the first convolution operation on second input features of a second frame of the plurality of video frames at the first layer;
comparing the first projection matrix to the second projection matrix to obtain a projection mask;
computing a third projection matrix by performing, on a first portion of third input features of the second frame based on the projection mask and based on the first layer and the second layer being key layers, mathematical operations comprising convolution at the set of non-key layers;
determining that a third layer of the neural network is a key layer;
using output features of the second layer from the first frame as input for the third layer of the neural network based on the determination that the second layer and third layer are key layers; and
generating label data for the video based on output of the third layer, wherein
the label data includes the location(s) of one or more regions relevant to computer vision or image processing tasks within the plurality of video frames.

11. The method of claim 10, further comprising:
compressing the first projection matrix to obtain a first compressed projection matrix; and
compressing the second projection matrix to obtain a second compressed projection matrix, wherein the comparison is between the first compressed projection matrix and the second compressed projection matrix.

12. The method of claim 11, further comprising:
performing a second convolution operation on parameters of the first projection matrix corresponding to the second portion based on the projection mask.

13. The method of claim 10, further comprising:
determining a second portion of the third input features based on the projection mask, wherein the projection mask indicates that parameters of the second projection matrix corresponding to the second portion have less than or equal to a threshold difference from corresponding parameters of the first projection matrix; and
using the second portion of the third input features as an input to the second layer.

14. The method of claim 10, further comprising:
storing the first projection matrix in memory during processing of the first frame; and
retrieving the first projection matrix from the memory during processing of the second frame to compute the third projection matrix.

15. An apparatus comprising an electronic device comprising a microprocessor and camera, wherein
the microprocessor is configured to process images using an algorithm comprising:
a first key layer configured to compute a first projection matrix by performing a first convolution operation on first input features of a first frame from a plurality of video frames, and to compute a second projection matrix by performing the first convolution operation on second input features of a second frame of the plurality of video frames at the first layer;
a mask component configured to generate a projection mask by comparing the first projection matrix to the second projection matrix;
a set of one or more non-key layers after the first key layer configured to compute a third projection matrix by mathematical operations comprising performing a second convolution operation on a first portion of third input features of the second frame at based on the projection mask and based on the first key layer being a key layer;
a second key layer after the set of non-key layers which is configured to perform a third convolution operation on the third input features of the second frame which are not in the first portion and on the output of the set of non-key layers based on the first key layer being a key layer; and
generating label data for the video based on the third projection matrix, and wherein the label data includes the location(s) of one or more regions relevant to computer vision or image processing tasks within the plurality of video frames.

16. The apparatus of claim 15, wherein the algorithm further comprises:
a compression component configured to compress the first projection matrix to obtain a first compressed projection matrix, and the to compress the second projection matrix to obtain a second compressed projection matrix.

17. The apparatus of claim 15, further comprising:
a memory configured to store the first projection matrix.

* * * * *